(12) United States Patent
Liu et al.

(10) Patent No.: US 10,768,685 B2
(45) Date of Patent: Sep. 8, 2020

(54) CONVOLUTIONAL OPERATION DEVICE AND METHOD

(71) Applicant: Shanghai Cambricon Information Technology Co., Ltd, Pudong New Area (CN)

(72) Inventors: Shaoli Liu, Pudong New Area (CN); Lei Zhang, Pudong New Area (CN); Tianshi Chen, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 0 days.

(21) Appl. No.: 16/528,973

(22) Filed: Aug. 1, 2019

(65) Prior Publication Data
US 2019/0354159 A1 Nov. 21, 2019

Related U.S. Application Data

(63) Continuation of application No. 16/482,710, filed on Jul. 31, 2019.

(30) Foreign Application Priority Data

Oct. 29, 2017 (CN) .......................... 2017 1 1118938

(51) Int. Cl.
*G06F 1/32* (2019.01)
*G06F 3/048* (2013.01)
*G06F 3/06* (2006.01)
*G06F 1/324* (2019.01)
*G06F 1/3296* (2019.01)
*G06F 3/0481* (2013.01)

(52) U.S. Cl.
CPC ............ *G06F 1/324* (2013.01); *G06F 1/3296* (2013.01); *G06F 3/0481* (2013.01); *G06F 3/0635* (2013.01)

(58) Field of Classification Search
CPC ...... G06F 1/324; G06F 1/3296; G06F 3/0481; G06F 3/0635
See application file for complete search history.

(56) References Cited

U.S. PATENT DOCUMENTS

2008/0307240 A1* 12/2008 Dahan .................. G06F 1/06 713/320
2018/0314936 A1* 11/2018 Barik .................. G06N 3/0454
2019/0073585 A1* 3/2019 Pu ............................ G06N 3/04

* cited by examiner

*Primary Examiner* — Stefan Stoynov
(74) *Attorney, Agent, or Firm* — Getech Law LLC; Jun Ye

(57) ABSTRACT

The application provides a Dynamic Voltage Frequency Scaling device. The Dynamic Voltage Frequency Scaling device in a convolutional operation device acquires working state information of the convolutional operation device and its internal units/modules in real time and scales working voltage or working frequency of the convolutional operation device and its internal units/modules according to the working state information of the convolutional operation device and its internal units/modules, so as to reduce the overall running power consumption of the convolutional operation device during the convolutional operation.

22 Claims, 4 Drawing Sheets

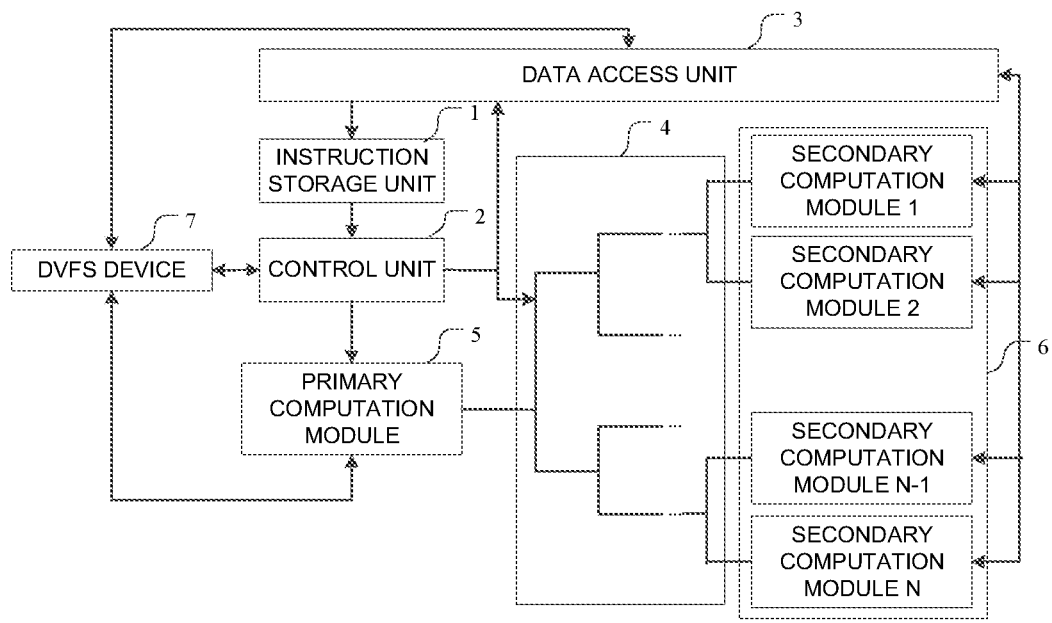
FIG. D1
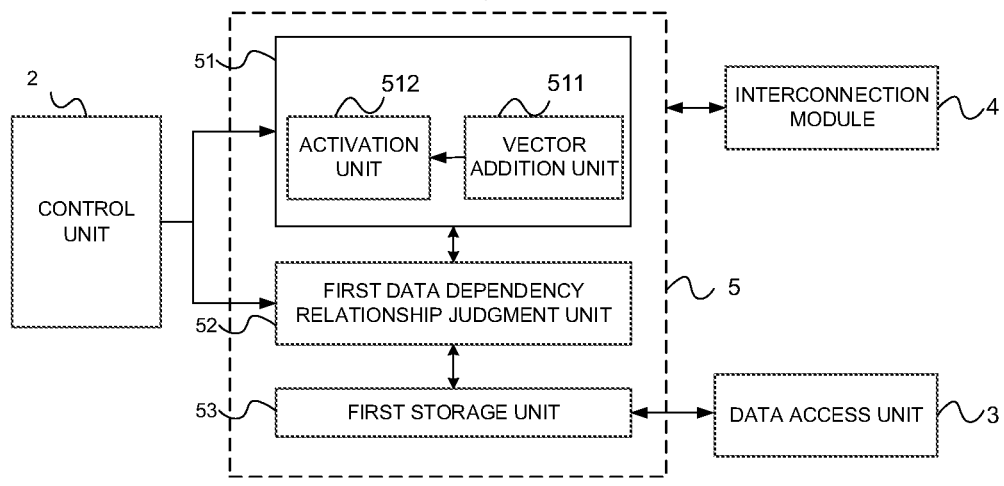
FIG. D2

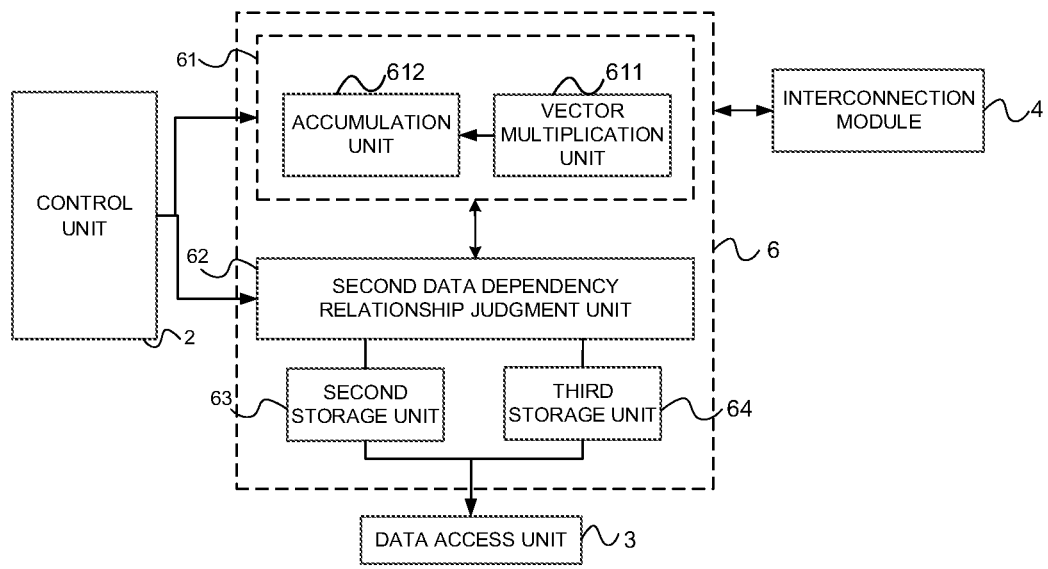
FIG. D3
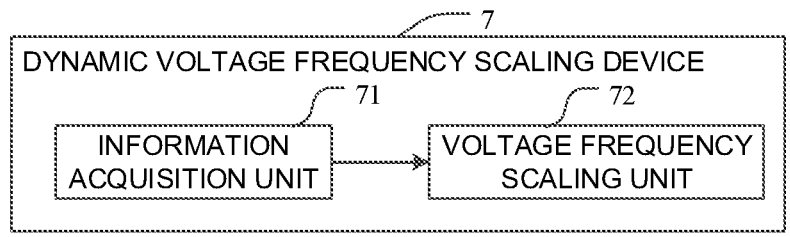
FIG. D4
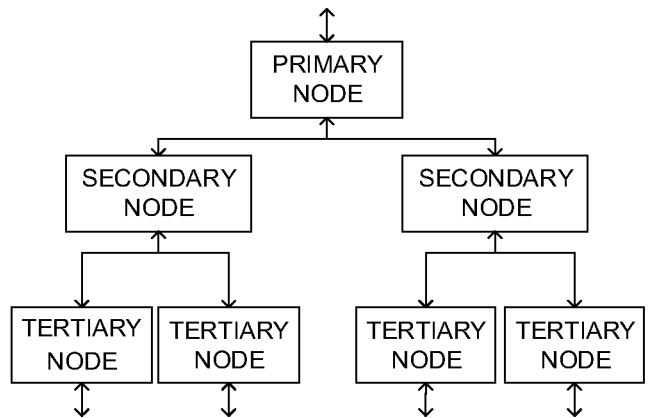
FIG. D5

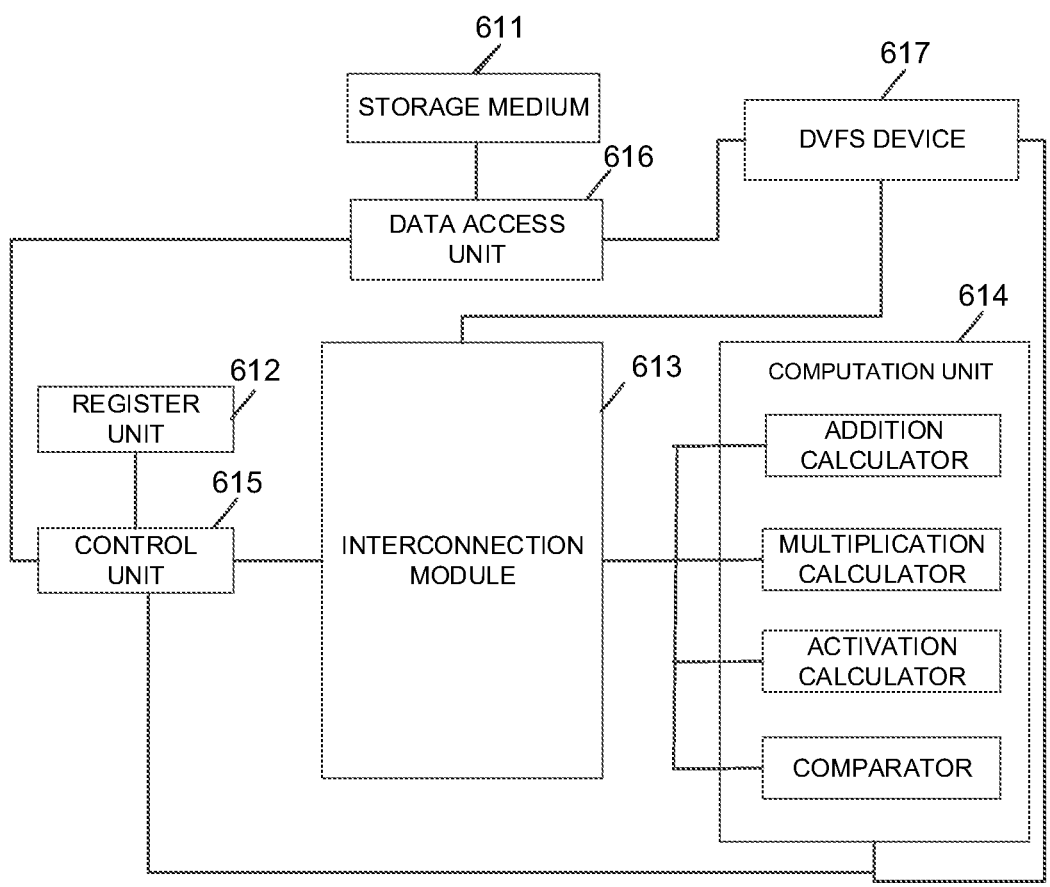
FIG. D6

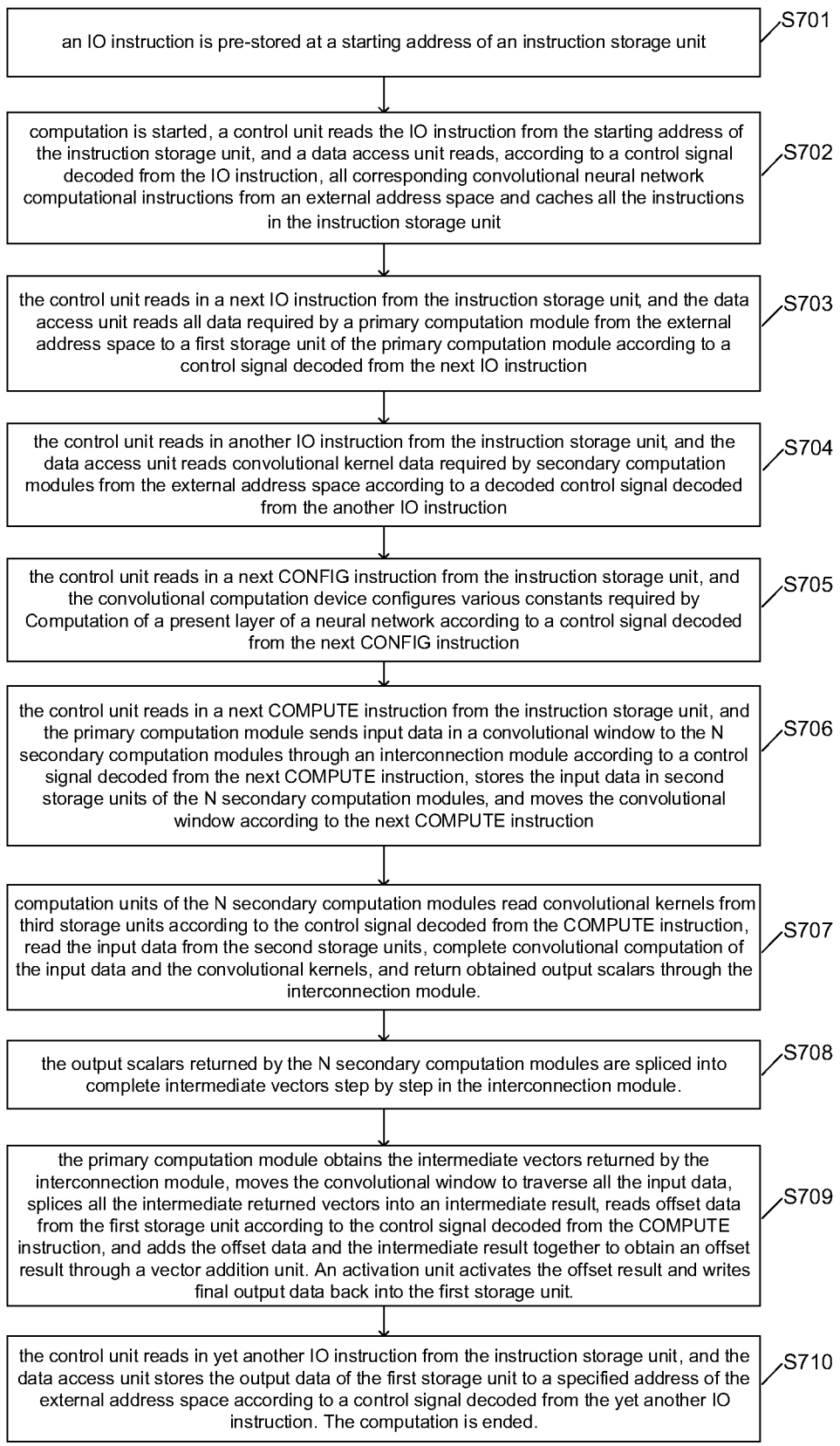
FIG. D7

CONVOLUTIONAL OPERATION DEVICE AND METHOD

TECHNICAL FIELD

The disclosure relates to an electronic field, and particularly to a convolutional operation device and method.

BACKGROUND

Along with increase of a working frequency and constant development of a semiconductor process, a problem about power consumption of a chip has become an important factor considered for a deep sub-nanometer integrated circuit. DVFS is a DVFS technology which is widely adopted for the field of semiconductors at present. Specifically, the DVFS technology dynamically scales a running frequency and voltage of a chip (for the same chip, if the frequency is higher, a higher voltage is required), thereby achieving a purpose of saving energy. However, in related arts, there are no DVFS methods and corresponding device designs applied to intelligent chips such as a convolutional operation device.

SUMMARY

An aspect of the application provides a convolutional operation device, which may include a DVFS device, an instruction storage unit, a control unit, a data access unit, an interconnection module, a primary computation module and N secondary computation modules, in which N may be an integer larger than 1.

The instruction storage unit may be configured to store an instruction read in by the data access unit.

The control unit may be configured to read the instruction from the instruction storage unit and decode the instruction into a control signal for controlling an operation of other modules, and the other modules may include the data access unit, the primary computation module, and the N secondary computation modules.

The data access unit may be configured to perform data or instruction read/write operation between an external address space and the convolutional operation device.

The N secondary computation modules are configured to implement convolutional computation of input data and convolution kernels in a convolutional neural network algorithm; The interconnection module may be configured for data transfer between the primary computation module and the secondary computation modules.

The primary computation module may be configured to splice intermediate vectors of all the input data into an intermediate result and perform subsequent operation on the intermediate result.

The DVFS device may be configured to acquire working state information of the convolutional operation device and send voltage frequency scaling information to the convolutional operation device according to the working state information of the convolutional operation device, in which the voltage frequency scaling information may be configured to instruct the convolutional operation device to scale its working voltage or working frequency.

An embodiment of the application, the primary computation module may be further configured to add the intermediate result and offset data, and perform an activation operation.

An embodiment of the application, the N secondary computation modules are configured to use the same input data and their respective convolutional kernels to concurrently compute respective output scalars.

An embodiment of the application, an active function active used by the primary computation module is any nonlinear function including sigmoid, tan h, relu, and softmax.

An embodiment of the application, the interconnection module forms a data path of continuous or discrete data between the primary computation module and the N secondary computation modules, and the interconnection module is any structure in a tree structure, a ring structure, a grid structure, a hierarchical interconnection structure, and a bus structure.

An embodiment of the application, the primary computation module may include:

a first storage unit configured to cache the input data and output data used by the primary computation module in a computation process;

a first computation unit configured to complete various computational functions of the primary computation module; and a first data dependency relationship judgment unit, configured as a port through which the first computation unit reads and writes the first storage unit to ensure data read/write consistency of the first storage unit; and configured to read an input neuron vector from the first storage unit, to send the input neuron vector to the N secondary computation modules through the interconnection module, and to send an intermediate result vector from the interconnection module to the first computation unit.

An embodiment of the application, each secondary computation module of the N secondary computation modules may include:

a second computation unit configured to receive the control signal sent by the control unit and perform arithmetic logical operation;

a second data dependency relationship judgment unit configured to perform a read/write operation on a second storage unit and a third storage unit in a computation process to ensure read/write consistency of the second storage unit and the third storage unit;

the second storage unit configured to cache the input data and the output scalar obtained by computation of each secondary computation module; and the third storage unit configured to cache the convolutional kernel required by each secondary computation module in the computation process.

An embodiment of the application, the first data dependency relationship judgment unit and the second data dependency relationship judgment unit ensure the read/write consistency in a manner of:

judging whether a dependency relationship is formed between data of a control signal which has yet not been performed and a control signal which is under performing, if a dependency relationship is not formed between data of a control signal which has yet not been performed and a control signal which is under performing, allowing the control signal to be sent immediately, otherwise allowing the control signal to be sent only after all control signals the control signal depends on are performed.

An embodiment of the application, the data access unit reads in at least one of the input data, the offset data, and the convolutional kernels from the external address space.

An embodiment of the application, the DVFS device may include:

an information acquisition unit configured to acquire the working state information of the convolutional operation device in real time; and a voltage frequency scaling unit configured to send the voltage frequency scaling information to the convolutional operation device according to the working state information of the convolutional operation device, in which the voltage frequency scaling information may be configured to instruct the convolutional operation device to scale its working voltage or working frequency.

An embodiment of the application, the working state information of the convolutional operation device may include an operating speed of the convolutional operation device, the voltage frequency scaling information may include first voltage frequency scaling information, and the voltage frequency scaling unit may be configured to:

if the operating speed of the convolutional operation device is greater than a target speed, send the first voltage frequency scaling information to the convolutional operation device, in which the first voltage frequency scaling information may be configured to instruct the convolutional operation device to decrease its working frequency or working voltage, where the target speed is an operating speed of the convolutional operation device if a user requirement is met.

An embodiment of the application, the working state information of the convolutional operation device may include an operating speed of the data access unit and an operating speed of the primary computation module, the voltage frequency scaling information may include second voltage frequency scaling information, and the voltage frequency scaling unit may be further configured to:

in response to determining, according to the operating speed of the data access unit and the operating speed of the primary computation module, that a running time of the data access unit exceeds a running time of the primary computation module, send the second voltage frequency scaling information to the primary computation module, in which the second voltage frequency scaling information may be configured to instruct the primary computation module to decrease its working frequency or working voltage.

An embodiment of the application, the voltage frequency scaling information may include third voltage frequency scaling information, and the voltage frequency scaling unit may be further configured to:

in response to determining, according to the operating speed of the data access unit and the operating speed of the primary computation module, that the running time of the primary computation module exceeds the running time of the data access unit, send the third voltage frequency scaling information to the data access unit, in which the third voltage frequency scaling information may be configured to instruct the data access unit to decrease its working frequency or working voltage.

An embodiment of the application, the working state information of the convolutional operation device may include working state information of at least S units/modules in the instruction storage unit, the control unit, the data access unit, the interconnection module, the primary computation module, and the N secondary computation modules, in which S may be an integer larger than one and less than or equal to N+5, the voltage frequency scaling information may include fourth voltage frequency scaling information, and the voltage frequency scaling unit may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage, where the unit A is any one of the at least S units/modules.

An embodiment of the application, the voltage frequency scaling information may include fifth voltage frequency scaling information, and the voltage frequency scaling unit may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

Another aspect of the application provides a neural network processor, which may include the abovementioned convolutional operation device.

Another aspect of the application provides an electronic device, which may include the abovementioned neural network processor.

Another aspect of the application provides a method for performing a single-layer convolutional neural network forward operation, which is applied to the abovementioned convolutional operation device and may include the follows:

pre-storing an input/output (IO) instruction at a starting address of an instruction storage unit;

if the computation is started, a control unit reading the IO instruction from the starting address of the instruction storage unit, and a data access unit reading, according to a control signal decoded from the IO instruction, all corresponding convolutional neural network computational instructions from an external address space and caching all the instructions in the instruction storage unit;

the control unit reading in a next IO instruction from the instruction storage unit, and the data access unit reading all data required by a primary computation module from the external address space to a first storage unit of the primary computation module according to a control signal decoded from the next IO instruction;

the control unit reading in another IO instruction from the instruction storage unit, and the data access unit reading convolutional kernel data required by secondary computation modules from the external address space according to a control signal decoded from another IO instruction;

the control unit reading in a next CONFIG instruction from the instruction storage unit, and the convolutional operation device configuring various constants required by computation of a present layer of a neural network according to a control signal decoded from the next CONFIG instruction;

the control unit reading in a next COMPUTE instruction from the instruction storage unit, and the primary computation module sending input data in a convolutional window to the N secondary computation modules through an interconnection module according to a control signal decoded from the next COMPUTE instruction, storing the input data in second storage unit of the N secondary computation modules, and moving the convolutional window according to the instruction;

computation units of the N secondary computation modules reading convolutional kernels from third storage unit according to the control signal decoded from the COMPUTE instruction, reading the input data from the second storage units, completing convolutional computation of the input data and the convolutional kernels, and returning obtained output scalars through the interconnection module;

splicing the output scalars returned by the N secondary computation modules into complete intermediate vectors step by step in the interconnection module;

the primary computation module obtaining the intermediate vectors returned by the interconnection module, moving the convolutional window to traverse all the input data, splicing all the returned intermediate vectors into an intermediate result, reading offset data from the first storage unit according to the control signal decoded from the COMPUTE instruction, and adding the offset data and the intermediate result together to obtain an offset result through a vector addition unit, an activation unit activating the offset result and writing final output data back into the first storage unit;

the control unit reading in yet another IO instruction from the instruction storage unit, and the data access unit storing the output data of the first storage unit to a specified address of the external address space according to a control signal decoded from the next IO instruction.

The computation is ended.

An embodiment of the application, the method may further include the follows:

acquiring working state information of the convolutional operation device in real time;

sending voltage frequency scaling information to the convolutional operation device according to the working state information of the convolutional operation device, in which the voltage frequency scaling information may be configured to instruct the convolutional operation device to scale its working voltage or working frequency.

An embodiment of the application, the working state information of the convolutional operation device may include an operating speed of the convolutional operation device, the voltage frequency scaling information may include first voltage frequency scaling information, and sending the voltage frequency scaling information to the convolutional operation device according to the working state information of the convolutional operation device may include:

if the operating speed of the convolutional operation device is greater than a target speed, sending the first voltage frequency scaling information to the convolutional operation device, in which the first voltage frequency scaling information may be configured to instruct the convolutional operation device to decrease its working frequency or working voltage, and the target speed may be an operating speed of the convolutional operation device if a user requirement is met.

An embodiment of the application, the working state information of the convolutional operation device may include an operating speed of the data access unit and an operating speed of the primary computation module, the voltage frequency scaling information may include second voltage frequency scaling information, and sending the voltage frequency scaling information to the convolutional operation device according to the working state information of the convolutional operation device further may include:

in response to determining, according to the operating speed of the data access unit and the operating speed of the primary computation unit, that the running time of the primary computation unit exceeds the running time of the data access unit, sending the second voltage frequency scaling information to the primary computation module, in which the second voltage frequency scaling information may be configured to instruct the primary computation module to decrease its working frequency or working voltage.

An embodiment of the application, the voltage frequency scaling information may include third voltage frequency scaling information, and sending the voltage frequency scaling information to the convolutional operation device according to the working state information of the convolutional operation device may further include:

in response to determining, according to the operating speed of the data access unit and the operating speed of the primary computation unit, that the running time of the primary computation unit exceeds the running time of the data access unit, sending the third voltage frequency scaling information to the data access unit, in which the third voltage frequency scaling information may be configured to instruct the data access unit to decrease its working frequency or working voltage.

An embodiment of the application, the working state information of the convolutional operation device may include working state information of at least S units/modules in the instruction storage unit, the control unit, the data access unit, the interconnection module, the primary computation module, and the N secondary computation modules, in which S may be an integer larger than one and less than or equal to N+5, the voltage frequency scaling information may include fourth voltage frequency scaling information, and sending the voltage frequency scaling information to the convolutional operation device according to the working state information of the convolutional operation device may further include:

in response to determining, according to the working state information of a unit A, that the unit A is in an idle state, sending the fourth voltage frequency scaling information to the unit A, in which the fourth voltage frequency scaling information may be configured to instruct the unit A to decrease its working frequency or working voltage, where the unit A is any one of the at least S units/modules.

An embodiment of the application, the voltage frequency scaling information may include fifth voltage frequency scaling information, and sending the voltage frequency scaling information to the convolutional operation device according to the working state information of the convolutional operation device may further include:

in response to determining, according to the working state information of the unit A, that the unit A returns to a working state, sending the fifth voltage frequency scaling information to the unit A, in which the fifth voltage frequency scaling information may be configured to instruct the unit A to increase its working voltage or working frequency.

Another aspect of the application provides a method for performing multilayer convolutional neural network forward operation, which may include:

performing the abovementioned method for single-layer convolutional neural network forward operation on each layer of the multilayer convolutional neural network, after performing for a previous layer of the multilayer convolutional neural network, a computational instruction of a present layer taking an output data address, stored in a primary computation module, of the previous layer as an input data address of the present layer, and changing convolutional kernel address and offset data address in the computational instruction into corresponding addresses of the present layer.

BRIEF DESCRIPTION OF THE DRAWINGS

FIG. D1 is a schematic structure diagram of a convolutional operation device according to an embodiment of the application.

FIG. D2 is an exemplary structure block diagram of a primary computation module in a convolutional operation device according to an embodiment of the application.

FIG. D3 is an exemplary structure block diagram of a secondary computation module in a convolutional operation device according to an embodiment of the application.

FIG. D4 is an exemplary structure block diagram of a DVFS device in a convolutional operation device according to an embodiment of the application.

FIG. D5 is a schematic diagram of an implementation mode of an interconnection module 4 according to an embodiment of the application.

FIG. D6 is a structure diagram of another convolutional operation device according to an embodiment of the application.

FIG. D7 is a schematic flowchart of a method for performing single-layer convolutional neural network forward operation according to an embodiment of the application.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

FIG. D1 is a structure diagram of a convolutional operation device according to an embodiment of the application. As shown in FIG. D1, the convolutional operation device may include a DVFS device 7, an instruction storage unit 1, a control unit 2, a data access unit 3, an interconnection module 4, a primary computation module 5, and N secondary computation modules 6.

All of the instruction storage unit 1, the control unit 2, the data access unit 3, the interconnection module 4, the primary computation module 5, and the N secondary computation modules 6 may be implemented through a hardware circuit (for example, including, but not limited to, an FPGA, a CGRA, an ASIC, an analogue circuit, and a memristor).

The instruction storage unit 1 may be configured to store an instruction read in by the data access unit 3.

The control unit 2 may be configured to read the instruction from the instruction storage unit 1, to decode the instruction into a control signal for controlling an operation of other modules, and to send the instruction to the other module, for example, the data access unit 3, the primary computation module 5, and the N secondary computation modules 6.

The data access unit 3 may be configured to perform data or instruction read/write operation between an external address space and the convolutional operation device.

In one implementation, the data access unit 3 may be configured to access the external address space and to directly read and write data from/into each unit in the device to complete data loading and storage.

The N secondary computation modules 6 are configured to implement convolutional computation of input data and convolution kernels in a convolutional neural network algorithm.

In one implementation, the N secondary computation modules 6 are configured to use the same input data and the respective convolutional kernels to concurrently compute respective output scalars.

The interconnection module 4 may be configured to connect the primary computation module 5 and the N secondary computation modules 6, and may implement different interconnection topologies (for example, a tree structure, a ring structure, a grid structure, a hierarchical interconnection, and a bus structure). The interconnection module 4 may implement data transfer between the primary computation module 5 and the N secondary computation modules 6.

In other words, the interconnection module 4 forms data paths of continuous or discrete data between the primary computation module 5 and the N secondary computation modules 6. The interconnection module 4 can be any structure of the tree structure, the ring structure, the grid structure, the hierarchical interconnection, and the bus structure.

The primary computation module 5 may be configured to splice intermediate vectors of all the input data into an intermediate result and to perform subsequent operation on the intermediate result.

The primary computation module 5 may be further configured to add the intermediate result and offset data and then to perform an activation operation. An active function active used by the primary computation module 5 is any nonlinear function of nonlinear functions including sigmoid, tan h, relu, and softmax.

In one implementation, the primary computation module 5 may include a first storage unit 53, a first computation unit 51, and a first data dependency relationship judgment unit 52.

The first storage unit 53 may be configured to cache input data and output data used by the primary computation module 5 in a computation process.

The first computation unit 51 may be configured to complete various computational functions of the primary computation module 5.

The first data dependency relationship judgment unit 52 may be configured as a port through which the first computation unit 51 reads and writes the first storage unit 53 to ensure data read/write consistency of the first storage unit 53, and may be configured to read an input neuron vector from the first storage unit 53, to send it to the N secondary computation modules 6 through the interconnection module 4, and to send an intermediate result vector from the interconnection module 4 to the first computation unit 51.

Each of the N secondary computation modules 6 may include a second computation unit 61, a second data dependency relationship judgment unit 62, a second storage unit 63, and a third storage unit 64.

The second computation unit 61 may be configured to receive a control signal sent by the control unit 2 and to perform an arithmetic logical operation.

The second data dependency relationship judgment unit 62 may be configured to perform a read/write operation on the second storage unit 63 and the third storage unit 64 in the computation process to ensure read/write consistency of the second storage unit 63 and the third storage unit 64.

The second storage unit 63 may be configured to cache the input data and the output scalar obtained by computation of the secondary computation module.

The third storage unit 64 may be configured to cache the convolutional kernel required by the secondary computation module in the computation process.

Furthermore, the first data dependency relationship judgment unit 52 and the second data dependency relationship judgment unit 62 ensure the read/write consistency in a manner of:

judging whether a dependency relationship is formed between data of a control signal which has yet not been performed and a control signal which is under performing, if a dependency relationship is not formed between data of a control signal which has yet not been performed and a control signal which is under performing, allowing the control signal to be sent immediately, otherwise allowing the control signal to be sent only after all control signals the control signal depends on are performed.

In one implementation, the data access unit 3 reads in at least one of the input data, the offset data, and the convolutional kernels from the external address space.

Before forward operation for a fully connected layer of a neural layer is started, the primary computation module 5 transfers the input data to each secondary computation module of the N secondary computation modules through the interconnection module 4. After the computation process of the N secondary computation modules 6 is ended, the interconnection module 4 splices the output scalars of the N secondary computation modules 6 into an intermediate vector step by step and transfers it back to the primary computation module 5.

A computation method for the convolutional operation device will be described with different computational instructions below according to an implementation of the application. The computational instruction is, for example, a convolutional computation instruction. The convolutional computation instruction may be applied to a neural network. Thus, the convolutional computation instruction may also be called a convolutional neural network instruction. For the convolutional computation instruction, a formula practically required to be performed may be:

$$s=s(\Sigma wx_i+b).$$

The formula represents that a convolutional kernel W (which may include multiple pieces of data) is multiplied by input data $\chi_i$, and a sum is computed. Then, an offset b may be added, in one implementation. Then, activation operation S(h) may be further performed to obtain a final output result S, in one implementation. The following computation topological structure may be obtained according to the formula: multiplication calculator-addition calculator-(optionally) activation calculator. The convolutional computation instruction may be included in an instruction set. The instruction set may include convolutional neural network COMPUTE instructions with different functions, a CONFIG instruction, an IO instruction, a NOOperation (NOP) instruction, a jump instruction, and a move instruction.

In an embodiment, the COMPUTE instructions include the following instructions.

A convolutional computation instruction: according to the instruction, the convolutional operation device extracts, from specified addresses of the memory (which may be a scratch pad memory or a scalar register file), input data with a specified size and a convolutional kernel respectively, and performs a convolutional operation in a convolutional computation component.

A convolutional neural network sigmoid instruction: according to the instruction, the convolutional operation device extracts, from specified addresses of the memory (which may be a scratch pad memory or a scalar register file), input data with a specified size and a convolutional kernel respectively, performs a convolutional operation in the convolutional computation component, and performs sigmoid activation on an output result.

A convolutional neural network tan h instruction: according to the instruction, the convolutional operation device extracts, from specified addresses of the memory (which may be a scratch pad memory), input data with a specified size and a convolutional kernel respectively, performs a convolutional operation in a convolutional computation component, and performs tan h activation on an output result.

A convolutional neural network ReLU instruction: according to the instruction, the convolutional operation device extracts, from specified addresses of the memory (which may be a scratch pad memory), input data with a specified size and a convolutional kernel respectively, performs a convolutional operation in a convolutional computation component, and performs ReLU activation on an output result.

A convolutional neural network group instruction: according to the instruction, the convolutional operation device extracts, from specified addresses of the memory (which may be a scratch pad memory), input data with a specified size and a convolutional kernel respectively, performs the convolutional operation in a convolutional computation component after grouping, and activates an output result.

The CONFIG instruction may be configured to configure various constants required by computation of a present layer before computation of each layer of an artificial neural network is started.

The IO instruction may be configured to read in input data required by computation from an external storage space and to store the data back into the external space after computation is completed.

The NOP instruction may be configured to clear present control signals in all control signal cache queues in the device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the device to another address of the internal address space of the device. The process is independent from the computation unit, with no resource of the computation unit occupied if being performed.

A method by which the convolutional operation device performs the convolutional computation instruction may be as follows.

The control unit 2 extracts the convolutional computation instruction, an operation field corresponding to the convolutional computation instruction, and a first computation topological structure corresponding to the convolutional computation instruction (multiplication calculator-addition calculator-addition calculator-activation calculator) from the instruction storage unit 1. The control unit transfers the operation field to the data access unit 3 and transfers the first computation topological structure to the interconnection module 4.

The data access unit 3 extracts a convolutional kernel w, which corresponding to the operation field, and the offset b (if b is equal to zero, the offset b is not required to be extracted) from an external storage medium, and transfers the convolutional kernel w and the offset b to the primary computation module 5.

In one implementation, the first result may include multiple multiplication computational results.

The DVFS device 7 may be configured to acquire working state information of the convolutional operation device and to send voltage frequency scaling information to the convolutional operation device according to the working state information of the convolutional operation device, in which the voltage frequency scaling information may be configured to instruct the convolutional operation device to scale its working voltage or working frequency.

In one implementation, the DVFS device 7 may include an information acquisition unit 71 and a voltage frequency scaling unit 72.

The information acquisition unit 71 may be configured to acquire the working state information of the convolutional operation device in real time.

The voltage frequency scaling unit 72 may be configured to send the voltage frequency scaling information to the convolutional operation device according to the working state information of the convolutional operation device, in which the voltage frequency scaling information may be configured to instruct the convolutional operation device 71 to scale its working voltage or working frequency.

An embodiment of the application, the working state information of the convolutional operation device may include an operating speed of the convolutional operation device, the voltage frequency scaling information may include first voltage frequency scaling information, and the voltage frequency scaling unit 72 may be configured to:

if the operating speed of the convolutional operation device is greater than a target speed, send the first voltage frequency scaling information to the convolutional operation device, in which the first voltage frequency scaling information may be configured to instruct the convolutional operation device to decrease its working frequency or working voltage and the target speed may be an operating speed of the convolutional operation device if a user requirement is met.

An embodiment of the application, the working state information of the convolutional operation device may include an operating speed of the data access unit 3 and an operating speed of the primary computation module 5, the voltage frequency scaling information may include second voltage frequency scaling information, and the voltage frequency scaling unit 72 may be further configured to:

in response to determining, according to the operating speed of the data access unit 3 and the operating speed of the primary computation module 5, that a running time of the data access unit 3 exceeds a running time of the primary computation module 5, send the second voltage frequency scaling information to the primary computation module 5, in which the second voltage frequency scaling information may be configured to instruct the primary computation module 5 to decrease its working frequency or working voltage.

Furthermore, the voltage frequency scaling information may include third voltage frequency scaling information, and the voltage frequency scaling unit 72 may be further configured to:

in response to determining, according to the operating speed of the data access unit 3 and the operating speed of the primary computation module 5, that the running time of the primary computation module 5 exceeds the running time of the data access unit 3, send the third voltage frequency scaling information to the data access unit 3, in which the third voltage frequency scaling information may be configured to instruct the data access unit 3 to decrease its working frequency or working voltage.

An embodiment of the application, the working state information of the convolutional operation device may include working state information of at least S units/modules of the instruction storage unit 1, the control unit 2, the data access unit 3, the interconnection module 4, the primary computation module 5, and the N secondary computation modules 6, in which S may be an integer larger than one and less than or equal to N+5, the voltage frequency scaling information may include fourth voltage frequency scaling information, and the voltage frequency scaling unit 72 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units/modules.

Furthermore, the voltage frequency scaling information may include fifth voltage frequency scaling information, and the voltage frequency scaling unit 72 may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

An embodiment of the application, an embodiment of the application provides a neural network processor, which may include the abovementioned convolutional operation device.

The neural network processor may be configured to perform artificial neural network computation and to implement artificial intelligence applications of voice recognition, image recognition, translation, and the like.

In a convolutional computation task, a working process of the DVFS device 7 in FIG. D1 is as follows.

A first condition: in a convolutional computation performing process of the neural network processor, the DVFS device 7 acquires operating speeds of the data access unit 3 and primary computation module 5 of the neural network processor in FIG. D1 in real time. If the DVFS device 7 determines, according to the operating speeds of the data access unit 3 and the primary computation module 5, that a running time of the data access unit 3 exceeds a running time of the primary computation module 5, the DVFS device 7 may determine that the data access unit 3 becomes a bottleneck in the convolutional computation process. After the primary computation module 5 completes performing a present convolutional computational operation, the primary computation module 5 may perform a convolutional computational operation according to data transferred by the data access unit 3 this time only after the data access unit 3 completes performing a reading task and transfers the read data to the primary computation module 5. The DVFS device 7 sends first voltage frequency scaling information to the primary computation module 5, in which the first voltage frequency scaling information may be configured to instruct the primary computation module 5 to decrease its working voltage or working frequency so as to reduce the operating speed of the primary computation module 5 and make the operating speed of the primary computation module 5 matched with the operating speed of the data access unit 3, which may reduce power consumption of the primary computation module 5, avoid occurrence of the condition that the primary computation module 5 is idle, and finally reduce overall running power consumption of the neural network processor under the condition of no influence on a completion time of the task.

A second condition: in the convolutional computation performing process of the neural network processor, the DVFS device 7 in FIG. D1 acquires the operating speeds of the data access unit 3 and primary computation module 5 of the neural network processor in real time. If the DVFS device 7 determines, according to the operating speeds of the data access unit 3 and the primary computation module 5, that the running time of the primary computation module 5 exceeds the running time of the data access unit 3, the DVFS device 7 may determine that the primary computation module 5 becomes a bottleneck in the convolutional computation process. After the data access unit 3 completes performing a present data reading operation, the data access unit 3 may transfer read data to the primary computation module 5 only after the primary computation module 5 performs a present convolutional computational operation. The DVFS device 7 sends second voltage frequency scaling information to the data access unit 3, in which the second voltage frequency scaling information may be configured to instruct the data access unit 3 to decrease its working voltage or working frequency so as to reduce the operating speed of the data access unit 3 and make the operating speed of the data access unit 3 matched with the operating speed of the primary computation module 5, which may reduce power consumption of the data access unit 3, avoid occurrence of the condition that the data access unit 3 is idle, and finally reduce the overall running power consumption of the neural network processor under the condition of no influence on the completion time of the task.

If the neural network processor performs the artificial neural network computation for an artificial intelligence application, the DVFS device 7 in FIG. D1 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 7 in FIG. D1 acquires a frame rate for video image processing of the neural network processor in real time. If the frame rate for video image processing exceeds a target frame rate, the target frame rate being a video image processing frame rate normally required by a user, the DVFS device 7 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 7 in FIG. D1 acquires a voice recognition speed of the neural network processor in real time. If the voice recognition speed of the neural network processor exceeds a practical voice recognition speed of the user, the DVFS device 7 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 7 in FIG. D1 monitors and acquires working state information of each unit or module (including the instruction storage unit 1, the control unit 2, the data access unit 3, the interconnection module 4, the primary computation module 5, and the N secondary computation modules 6) in the neural network processor in real time. If any unit or module in each unit or module of the neural network processor is in an idle state, the DVFS device 7 sends fifth voltage frequency scaling information to the unit or module to decrease a working voltage or working frequency of the unit or the module to reduce power consumption of the unit or the module. If the unit or the module returns to a working state, the DVFS device 7 sends sixth voltage frequency scaling information to the unit or the module to increase the working voltage or working frequency of the unit or the module, so as to enable an operating speed of the unit or the module to meet a working requirement.

FIG. D5 schematically shows an implementation mode of the interconnection module 4: an H tree module. The interconnection module 4 forms data paths between the primary computation module 5 and the multiple secondary computation modules 6, and has binary tree paths formed by multiple nodes. Each node sends data of an upstream to two nodes of a downstream, merges data returned by the two nodes of the downstream, and returns the data merged to the node of the upstream. For example, in a computation starting stage of a convolutional neural network, neuron data in the primary computation module 5 is sent to each secondary computation module 6 through the interconnection module 4. After a computation process of the secondary computation module 6 is completed, values of neurons output by each secondary computation module are spliced into a complete vector formed by neurons step by step in the interconnection module. For example, if there are totally N secondary computation modules in the convolutional operation device, input data xi is sent to the N secondary computation modules, each secondary computation module performs convolutional computation on the input data xi and a convolutional kernel corresponding to the secondary computation module to obtain scalar data, and the interconnection module 4 merges the scalar data of each secondary computation module into an intermediate vector including N elements. If a convolutional window obtains totally A*B (A in an X direction and B in a Y direction, X and Y being coordinate axes of a three-dimensional orthogonal coordinate system) pieces of input data xi by traversing, a convolutional operation is performed on the A*B pieces of xi, and all obtained vectors are merged in the primary computation module to obtain a three-dimensional intermediate result of A*B*N.

FIG. D2 is an exemplary structure block diagram of a primary computation module 5 in a device for performing convolutional neural network forward operation according to an embodiment of the application. As shown in FIG. D2, the primary computation module 5 may include a first computation unit 51, a first data dependency relationship judgment unit 52, and a first storage unit 53.

The first computation unit 51 may include a vector addition unit 511 and an activation unit 512. The first computation unit 51 may be configured to receive a control signal from the control unit 2 in FIG. D1 and to realize various computational functions of the primary computation module 5. The vector addition unit 511 may be configured to implement an offset addition operation for convolutional neural network forward operation, and to correspondingly add offset data and the intermediate result to obtain an offset result. The activation unit 512 performs an active function operation on the offset result. The offset data may be read in from an external address space, and may also be locally stored.

The first data dependency relationship judgment unit 52 may be configured as a port through which the first computation unit 51 reads and writes the first storage unit 53, to ensure data read/write consistency of the first storage unit 53. In addition, the first data dependency relationship judgment unit 52 is also responsible for sending data read from the first storage unit 53 to the secondary computation modules 6 through the interconnection module 4. Output data of the secondary computation modules 6 is directly sent to the first computation unit 51 through the interconnection module 4. An instruction output by the control unit 2 is sent to the computation unit 51 and the first data dependency relationship judgment unit 52 to control their operations.

The storage unit 53 may be configured to cache input data and output data used by the primary computation module 5 in a computation process.

FIG. D3 is an exemplary structure block diagram of a secondary computation module 6 in a device for performing convolutional neural network forward operation according to an embodiment of the application. As shown in FIG. D3, each secondary computation module 6 may include a second computation unit 61, a second data dependency relationship judgment unit 62, a second storage unit 63, and a third storage unit 64.

The second computation unit 61 may be configured to receive the control signal sent by the control unit 2 in FIG. D1 and to perform a convolutional computation. The second computation unit may include a vector multiplication unit 611 responsible for vector multiplication computation and an accumulation unit 612 responsible for accumulation computation of the convolutional computation.

The second data dependency relationship judgment unit 62 is responsible for a read/write operation over the second storage unit 63 in the computation process. The second data dependency relationship judgment unit 62 may be configured to ensure that there is no read/write consistency conflict between data used for instructions before performing the read/write operation. For example, all control signals sent to the second data dependency relationship judgment unit 62 may be stored in an instruction queue of the second data dependency relationship judgment unit 62. In this queue, if a data reading range of a read instruction conflicts with a data writing range of a write instruction located in the front of the queue, the instruction may be performed only after the write instruction it depends on is performed.

The second storage unit 63 may be configured to cache input data and output scalar data of the secondary computation module 6.

The third storage unit 64 may be configured to cache convolutional kernel data required by the secondary computation module 6 in the computation process.

An embodiment of the application provides a neural network processor, which may include the abovementioned convolutional operation device.

The neural network processor may be configured to perform artificial neural network computation and to implement artificial intelligence applications of voice recognition, image recognition, translation, and the like.

In a possible application scenario, for a convolutional computation task, a working process of the DVFS device 7 in FIG. D1 is as follows.

The information acquisition unit 71 of the DVFS device 7 acquires working state information or application scenario information of the neural network processor connected with the DVFS device 7 in real time, in which the application scenario information may be information obtained by the neural network processor through neural network computation or acquired by a sensor connected with the neural network processor. The voltage frequency scaling unit 72 of the DVFS device 7 sends voltage frequency scaling information to the neural network processor according to the working state information or application scenario information of the neural network processor, in which the voltage frequency scaling information may be configured to instruct the neural network processor to scale its working voltage or working frequency.

An embodiment of the application, the working state information of the neural network processor may include an operating speed of the neural network processor, the voltage frequency scaling information may include first voltage frequency scaling information, and the voltage frequency scaling unit 72 may be configured to:

if the operating speed of the neural network processor is greater than a target speed, send the first voltage frequency scaling information to the neural network processor, in which the first voltage frequency scaling information may be configured to instruct the neural network processor to decrease its working frequency or working voltage and the target speed may be an operating speed of the neural network processor if a user requirement is met.

In one implementation, the information acquisition unit 71 acquires the operating speed of the neural network processor connected thereto in real time. The operating speed of the neural network processor may be different types of speeds according to different tasks performed by the neural network processor. If an operation performed by the neural network processor is video image processing, the operating speed of the neural network processor may be a frame rate for video image processing of the neural network processor. If the operation performed by the neural network processor is voice recognition, the operating speed of the chip is a speed for voice recognition over information. In response to determining that the operating speed of the neural network processor is greater than the target speed, in other words, the operating speed of the neural network processor reaches the operating speed of the neural network processor if the user requirement is met, the voltage frequency scaling unit 72 sends the first voltage frequency scaling information to the neural network processor to instruct the neural network processor to decrease its working voltage or working frequency so as to reduce power consumption of the neural network processor.

For example, assume that the operation performed by the neural network processor is video image processing and the target speed is 24 frames/second. The information acquisition unit 71 acquires the frame rate for video image processing of the neural network processor in real time. A present frame rate for video image processing of the neural network processor is 54 frames/second. In response to determining that the present frame rate for video image processing of the neural network processor is higher than the target speed, the voltage frequency scaling unit 72 sends the first voltage frequency scaling information to the neural network processor to instruct the neural network processor to decrease its working voltage or working frequency so as to reduce the power consumption of the neural network processor.

An embodiment of the application, the neural network processor may include at least a first unit and a second unit. Output data of the first unit is input data of the second unit. The working state information of the neural network processor may include an operating speed of the first unit and an operating speed of the second unit. The voltage frequency scaling information may include second voltage frequency scaling information. The voltage frequency scaling unit 72 is further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

In one implementation, task performing of the neural network processor requires cooperation of the first unit and the second unit. The output data of the first unit is the input data of the second unit. The information acquisition unit 71 acquires the operating speeds of the first unit and the second unit in real time. In response to determining that the operating speed of the first unit is lower than the operating speed of the second unit, in other words, the running time of the first unit exceeds the running time of the second unit, the voltage frequency scaling unit 72 sends the second voltage frequency scaling information to the second unit to instruct the second unit to decrease its working voltage or working frequency to reduce the overall power consumption of the neural network processor on the premise of no influence on the overall operating speed of the neural network processor.

An embodiment of the application, the voltage frequency scaling information may include third voltage frequency scaling information, and the voltage frequency scaling unit 72 is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

In one implementation, task performing of the neural network processor requires cooperation of the first unit and the second unit. The output data of the first unit is the input data of the second unit. The information acquisition unit 71 acquires the operating speeds of the first unit and the second unit in real time. In response to determining that the operating speed of the first unit is greater than the operating speed of the second unit, in other words, the running time of the second unit exceeds the running time of the first unit, the voltage frequency scaling unit 72 sends the third voltage frequency scaling information to the first unit to instruct the first unit to decrease its working voltage or working frequency to reduce the overall power consumption of the neural network processor on the premise of no influence on the overall operating speed of the neural network processor.

An embodiment of the application, the neural network processor may include at least N units, the working state information of the neural network processor may include working state information of at least S units of the at least N units, in which N may be an integer larger than one and S may be an integer less than or equal to N, the voltage frequency scaling information may include fourth voltage frequency scaling information, and the voltage frequency scaling unit 72 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units.

An embodiment of the application, the voltage frequency scaling information may include fifth voltage frequency scaling information, and the voltage frequency scaling unit 72 may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

In one implementation, in a working process of the neural network processor, the information acquisition unit 71 acquires the working state information of the at least S units in the neural network processor in real time. In response to determining, according to the working state information of the unit A, that the unit A is in the idle state, the voltage frequency scaling unit 72 sends the fourth voltage frequency scaling information to the unit A to instruct the unit A to decrease its working frequency or working voltage to reduce power consumption of the unit A. In response to determining, according to the working state information of the unit A, that the unit A returns to the working state, the voltage frequency scaling unit 72 sends the fifth voltage frequency scaling information to the unit A to instruct the unit A to increase its working frequency or working voltage so as to enable an operating speed of the unit A to meet a working requirement.

An embodiment of the application, an application scenario of the neural network processor is image recognition, the application scenario information may include the count of objects in an image to be recognized, in which the voltage frequency scaling information may include sixth voltage frequency scaling information, and the voltage frequency scaling unit 72 may be further configured to:

in response to determining that the count of the objects in the image to be recognized is smaller than a first threshold value, send the sixth voltage frequency scaling information to the neural network processor, in which the sixth voltage frequency scaling information may be configured to instruct the neural network processor to decrease its working voltage or working frequency.

In one implementation, the neural network processor is applied to image recognition. The count of the objects in the image to be recognized is obtained by the neural network processor through a neural network algorithm. After the information acquisition unit 71 acquires the count of the objects in the image to be recognized (for example, the application scenario information) from the neural network processor, in response to determining, by the voltage frequency scaling unit 72, that the count of the objects in the image to be recognized is smaller than the first threshold value, the voltage frequency scaling unit 72 sends the sixth voltage frequency scaling information to the neural network processor to instruct the neural network processor to decrease its working voltage or working frequency. In response to determining that the count of the objects in the image to be recognized is larger than the first threshold value, the voltage frequency scaling unit 72 sends voltage frequency scaling information configured to instruct the neural network processor to increase its working voltage or working frequency to the neural network processor.

An embodiment of the application, the application scenario information is object tag information, the voltage frequency scaling information may include seventh voltage frequency scaling information, and the voltage frequency scaling unit 72 may be further configured to:

in response to determining that the object tag information belongs to a preset object tag set, send the seventh voltage frequency scaling information to the neural network processor, in which the seventh voltage frequency scaling information may be configured to instruct the neural network processor to increase its working voltage or working frequency.

For example, the preset object tag set may include multiple object tags. The object tag may be "human", "dog", "tree", and "flower". If the neural network processor determines, through the neural network algorithm, that the present application scenario may include a dog, after the neural network processor transfers object tag information including the "dog" to the information acquisition unit 71; the voltage frequency scaling unit 72, in response to determining that the object tag information may include the "dog", sends the seventh voltage frequency scaling information to the neural network processor to instruct the neural network processor to increase its working voltage or working frequency. In response to determining that the object tag information does not belong to the preset object tag set, the voltage frequency scaling unit 72 sends voltage frequency scaling information configured to instruct the neural network processor to decrease its working voltage or working frequency to the neural network processor.

An embodiment of the application, the neural network processor is applied to voice recognition, the application scenario information is a voice input rate, the voltage frequency scaling information may include eighth voltage frequency scaling information, and the voltage frequency scaling unit 72 may be further configured to:

if the voice input rate is lower than a second threshold value, send the eighth voltage frequency scaling information to the neural network processor, in which the eighth voltage frequency scaling information may be configured to instruct the neural network processor to decrease its working voltage or working frequency.

In one implementation, if the application scenario of the neural network processor is voice recognition, an input unit of the neural network processor inputs a voice to the neural network processor according to a certain rate. The information acquisition unit 71 acquires the voice input rate in real time and transfers voice input rate information to the voltage frequency scaling unit 72. In response to determining that the voice input rate is lower than the second threshold value, the voltage frequency scaling unit 72 sends the eighth voltage frequency scaling information to the neural network processor to instruct the neural network processor to decrease its working voltage or working frequency. In response to determining that the voice input rate is higher than the second threshold value, the voltage frequency scaling unit 72 sends voltage frequency scaling information configured to instruct the neural network processor to increase its working voltage or working frequency to the neural network processor.

An embodiment of the application, if the application scenario information is a keyword obtained by voice recognition performed by the neural network processor, the voltage frequency scaling information may include ninth voltage frequency scaling information, and the voltage frequency scaling unit may be further configured to:

in response to determining that the keyword belongs to a preset keyword set, send the ninth voltage frequency scaling information to the neural network processor, in which the ninth voltage frequency scaling information may be configured to instruct the neural network processor to increase its working voltage or working frequency.

Furthermore, if the keyword does not belong to the keyword set, the voltage frequency scaling unit 72 sends the voltage frequency scaling information configured to instruct the neural network processor to decrease its working voltage or working frequency to the neural network processor.

For example, the application scenario of the neural network processor is voice recognition. The preset keyword set may include keywords such as "image retouching", "neural network algorithm", "image processing", and "Alipay". If the application scenario information is "image retouching", the voltage frequency scaling unit 72 sends the ninth voltage frequency scaling information to instruct the neural network processor to increase its working voltage or working frequency. If the application scenario information is "photographing", the voltage frequency scaling unit 72 sends voltage frequency scaling information configured to instruct the neural network processor to decrease its working voltage or working frequency to the neural network processor.

An embodiment of the application, if the neural network processor is applied to machine translation, the application scenario information may include a character input speed or the count of characters in an image to be translated, the voltage frequency scaling information may include tenth voltage frequency scaling information, and the voltage frequency scaling unit 72 may be further configured to:

if the character input speed is lower than a third threshold value or the count of the characters in the image to be translated is smaller than a fourth threshold value, send the tenth voltage frequency scaling information to the neural network processor, in which the tenth voltage frequency scaling information may be configured to instruct the neural network processor to decrease its working voltage or working frequency.

In one implementation, the neural network processor is applied to machine translation. The application scenario information acquired by the information acquisition unit 71 is the character input speed or the count of the characters in the image to be translated, and the application scenario information is transferred to the voltage frequency scaling unit 72. In response to determining that the character input speed is lower than the third threshold value or the count of the characters in the image to be translated is smaller than the fourth threshold value, the voltage frequency scaling unit 72 sends the tenth voltage frequency scaling information to the neural network processor to instruct the neural network processor to decrease its working voltage. In response to determining that the character input speed is greater than the third threshold value or the count of the characters in the image to be translated is larger than the fourth threshold value, the voltage frequency scaling unit 72 sends voltage frequency scaling information configured to instruct the neural network processor to increase its working voltage to the neural network processor.

An embodiment of the application, if the application scenario information is an external light intensity, the voltage frequency scaling information may include eleventh voltage frequency scaling information, and the voltage frequency scaling unit 72 may be further configured to:

if the external light intensity is lower than a fifth threshold value, send the eleventh voltage frequency scaling information to the neural network processor, in which the eleventh voltage frequency scaling information may be configured to instruct the neural network processor to decrease its working voltage or working frequency.

In one implementation, the external light intensity is acquired by a light sensor connected with the neural network processor. After acquiring the light intensity, the information acquisition unit 71 transfers the light intensity to the voltage frequency scaling unit 72. In response to determining that the light intensity is lower than the fifth threshold value, the voltage frequency scaling unit 72 sends the eleventh voltage frequency scaling information to the neural network processor to instruct the neural network processor to decrease its working voltage. In response to determining that the light intensity is higher than the fifth threshold value, the voltage frequency scaling unit 72 sends voltage frequency scaling information configured to instruct the neural network processor to increase its working voltage or working frequency to the neural network processor.

An embodiment of the application, the neural network processor is applied to image retouching, the voltage frequency scaling information may include twelfth voltage frequency scaling information and thirteenth voltage frequency scaling information, and the voltage frequency scaling unit 72 may be further configured to:

if the application scenario information is a face image, send the twelfth voltage frequency scaling information to the neural network processor, in which the twelfth voltage frequency scaling information may be configured to instruct the neural network processor to increase its working voltage or working frequency, and if the application scenario information is not a face image, send the thirteenth voltage frequency scaling information to the neural network processor, in which the thirteenth voltage frequency scaling information may be configured to instruct the neural network processor to decrease its working voltage or working frequency.

An embodiment of the application, if the neural network processor is applied to voice recognition, the application scenario information is voice intensity. If the voice intensity is higher than a sixth threshold value, the voltage frequency scaling unit 72 sends, to the neural network processor, voltage frequency scaling information configured to instruct the neural network processor to decrease its working voltage or working frequency. If the voice intensity is lower than the sixth threshold value, the voltage frequency scaling unit 72 sends voltage frequency scaling information configured to instruct the neural network processor to increase its working voltage or working frequency to the neural network processor.

It is to be noted that the scenario information may be external scenario information, for example, the light intensity and the voice intensity, acquired by a sensor. The application scenario information may also be information computed according to an artificial intelligence algorithm. For example, in an object recognition task, real-time computation result information of the neural network processor may be fed back to the information acquisition unit. The information may include information such as the count of objects in a scenario, a face image, and an object tag keyword.

In one implementation, the artificial intelligence algorithm may include, but is not limited to, the neural network algorithm.

FIG. D6 is a schematic structure diagram of another convolutional operation device according to an embodiment of the application. As shown in FIG. D6, the convolutional operation device may include a DVFS device 617, a register unit 612, an interconnection module 613, a computation unit 614, a control unit 615, and a data access unit 616.

The computation unit 614 may include at least two of an addition calculator, a multiplication calculator, a comparator, and an activation calculator.

The interconnection module 613 may be configured to control a connection relationship of the calculators in the computation unit 614 to enable the at least two calculators to form different computation topological structures.

The register unit 612 (which may be a register unit, an instruction cache, and a scratch pad memory) may be configured to store an operation instruction, an address of a data block in a storage medium, and the computation topological structure corresponding to the operation instruction.

In one implementation, the convolutional operation device may further include a storage medium 611.

The storage medium 611 may be an off-chip memory, of course, may also be an on-chip memory during a practical application, and may be configured to store the data block. The data block may specifically be n-dimensional data, in which n may be an integer more than or equal to one. For example, the data block is one-dimensional data, for example, a vector, if n=1; the data block is two-dimensional data, for example, a matrix, if n=2; and the data block is multidimensional data if n>3.

The control unit 615 may be configured to extract the operation instruction, an operation field corresponding to the operation instruction, and a first computation topological structure corresponding to the operation instruction from the register unit 612, to decode the operation instruction into an performing instruction, in which the performing instruction may be configured to control the computation unit 614 to perform a computational operation, to transfer the operation field to the data access unit 616, and to transfer the computation topological structure to the interconnection module 613.

The data access unit 616 may be configured to extract the data block corresponding to the operation field from the storage medium 611 and to transfer the data block to the interconnection module 613.

The interconnection module 613 may be configured to receive the data block of the first computation topological structure.

An embodiment of the application, the interconnection module 613 may be further configured to replace the data block according to the first computation topological structure.

The computation unit 614 may be configured to call the calculator of the computation unit 614 to perform the computational operation on the data block to obtain a computational result according to the performing instruction, to transfer the computational result to the data access unit 616, and to store it in the storage medium 611.

An embodiment of the application, the computation unit 614 may be further configured to call the calculator to perform a computational operation on the replaced data block to obtain a computational result according to the first computation topological structure and the performing instruction, to transfer the computational result to the data access unit 616, and to store it in the storage medium 611.

An embodiment, the interconnection module 613 may be further configured to, according to the connection relationship of the calculators in the computation unit 614, form the first computation topological structure.

The DVFS device 617 may be configured to monitor a working state of the whole convolutional operation device, and to dynamically scale a voltage and a frequency of the whole convolutional operation device.

A computation method for the convolutional operation device will be described with different computational instructions below according to an implementation of the application. The computational instruction is, for example, a convolutional computation instruction. The convolutional computation instruction may be applied to a neural network. Thus, the convolutional computation instruction may also be called a convolutional neural network instruction. For the convolutional computation instruction, a formula practically required to be performed may be:

$$s=s(\Sigma wx_i+b).$$

The formula represents that a convolutional kernel W (which may include multiple pieces of data) is multiplied by input data $\chi_i$, and a sum is computed. Then, an offset b may be added. Then, activation operation s(h) may further be performed to obtain a final output result S. The following computation topological structure may be obtained according to the formula: multiplication calculator-addition calculator-(optionally) activation calculator. The convolutional computation instruction may be included in an instruction set. The instruction set may include convolutional neural network COMPUTE instructions with different functions, a CONFIG instruction, an IO instruction, a NOOperation (NOP) instruction, a jump instruction, and a move instruction.

In an embodiment, the COMPUTE instructions include the following instructions.

A convolutional computation instruction: according to the instruction, the convolutional operation device extracts, from specified addresses of the memory (which may be a scratch pad memory or a scalar register file), input data with a specified size and a convolutional kernel respectively, and performs a convolutional operation in a convolutional computation component.

A convolutional neural network sigmoid instruction: according to the instruction, the convolutional operation device extracts, from specified addresses of the memory (which may be a scratch pad memory or a scalar register file), input data with a specified size and a convolutional kernel respectively, performs a convolutional operation in a convolutional computation component, and performs sigmoid activation on an output result.

A convolutional neural network tan h instruction: according to the instruction, the convolutional operation device extracts, from specified addresses of the memory (which may be a scratch pad memory), input data with a specified size and a convolutional kernel respectively, performs a convolutional operation in a convolutional computation component, and performs tan h activation on an output result.

A convolutional neural network ReLU instruction: according to the instruction, the device extracts, from specified addresses of the memory (which may be a scratch pad memory), input data with a specified size and a convolutional kernel respectively, performs the convolutional operation in a convolutional computation component and performs ReLU activation on the output result.

A convolutional neural network group instruction: according to the instruction, the convolutional operation device extracts, from specified addresses of the memory (which may be a scratch pad memory), input data with a specified size and a convolutional kernel respectively, performs the convolutional operation in a convolutional computation component after grouping, and preferably activates the output result.

The CONFIG instruction may be configured to configure various constants required by computation of a present layer before computation of each layer of an artificial neural network is started.

The IO instruction may be configured to read in input data required by computation from an external storage space and store the data back into the external space after computation is completed.

The NOP instruction may be configured to clear present control signals in all control signal cache queues in the device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the convolutional operation device to another address of the internal address space of the convolutional operation device. The process is independent from the computation unit, with no resource of the computation unit occupied if being performed.

A method by which the convolutional operation device performs the convolutional computation instruction may be as follows.

The control unit 615 extracts the convolutional computation instruction, an operation field corresponding to the convolutional computation instruction, and a first computation topological structure corresponding to the convolutional computation instruction (multiplication calculator-addition calculator-addition calculator-activation calculator) from the register unit 612. The control unit transfers the operation field to the data access unit 616 and transfers the first computation topological structure to the interconnection module 613.

The data access unit 616 extracts a convolutional kernel w, which corresponds to the operation field, and the offset b (if b is zero, the offset b is not required to be extracted) from the storage medium 611, and transfers the convolutional kernel w and the offset b to the computation unit 614.

The multiplication calculator of the computation unit 614 performs multiplication computation on the convolutional kernel w and input data Xi to obtain a first result and inputs the first result to the addition calculator. Addition computation is performed to obtain a second result. Addition computation is performed on the second result and the offset b to obtain a third result. The third result is transferred to the activation calculator. Activation operation is performed to obtain an output result S. The output result S is transferred to the data access unit 616 for storage in the storage medium 611. In one implementation, after each operation, an output result of each operation may directly be transferred to the data access unit 616 for storage in the storage medium 611 without waiting for performing of the next operations. In addition, the operation that the addition computation is performed on the second result and the offset b to obtain the third result is optional, in other words, if b is zero, the operation is not required. Moreover, a sequence of the addition computation and the multiplication computation may be exchanged.

In one implementation, the first result may include multiple multiplication computational results.

An embodiment of the application, an embodiment of the application provides a neural network processor, which may include the abovementioned convolutional operation device.

The neural network processor may be configured to perform artificial neural network computation so as to implement artificial intelligence applications of voice recognition, image recognition, translation, and the like.

In a convolutional computation task, a working process of the DVFS device 617 in FIG. D6 is as follows.

A first condition: in a convolutional computation performing process of the neural network processor, the DVFS device 617 in FIG. D6 acquires operating speeds of the data access unit 616 and computation unit 614 of the neural network processor in real time. If the DVFS device 617 determines, according to the operating speeds of the data access unit 616 and the computation unit 614, that a running time of the data access unit 616 exceeds a running time of the computation unit 614, the DVFS device 617 may determine that the data access unit 616 becomes a bottleneck in the convolutional computation process. After the computation unit 614 completes performing a present convolutional computational operation, the computation unit 614 may perform a convolutional computational operation according to data transferred by the data access unit 616 this time only after the data access unit 616 completes performing a reading task and transfers the read data to the computation unit 614. The DVFS device 617 sends first voltage frequency scaling information to the computation unit 614, in which the first voltage frequency scaling information may be configured to instruct the computation unit 614 to decrease its working voltage or working frequency, so as to reduce the operating speed of the computation unit 614 and make the operating speed of the computation unit 614 matched with the operating speed of the data access unit 616, which may reduce power consumption of the computation unit 614, avoid occurrence of the condition that the computation unit 614 is idle, and finally reduce overall running power consumption of the neural network processor under the condition of no influence on a completion time of the task.

A second condition: in the convolutional computation performing process of the neural network processor, the DVFS device 617 acquires the operating speeds of the data access unit 616 and computation unit 614 of the neural network processor in real time. If the DVFS device 617 determines, according to the operating speeds of the data access unit 616 and the computation unit 614, that the running time of the computation unit 614 exceeds the running time of the data access unit 616, the DVFS device 617 may determine that the computation unit 614 becomes a bottleneck in the convolutional computation process. After the data access unit 616 completes performing a present data reading operation, the data access unit 616 may transfer read data to the computation unit 614 only after the computation unit 614 performs a present convolutional computational operation. The DVFS device 617 sends second voltage frequency scaling information to the data access unit 616, in which the second voltage frequency scaling information may be configured to instruct the data access unit 616 to decrease its working voltage or working frequency to reduce the operating speed of the data access unit 616 and make the operating speed of the data access unit 616 matched with the operating speed of the computation unit 614, which may reduce power consumption of the data access unit 616, avoid occurrence of the condition that the data access unit 616 is idle, and finally reduce the overall running power consumption of the neural network processor under the condition of no influence on the completion time of the task.

If the neural network processor performs artificial neural network computation for an artificial intelligence application, the DVFS device 617 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 617 acquires a frame rate for video image processing of the neural network processor in real time. If the frame rate for video image processing exceeds a target frame rate, the target frame rate being a video image processing frame rate normally required by a user, the DVFS device 617 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 617 acquires a voice recognition speed of the neural network processor in real time. If the voice recognition speed of the neural network processor exceeds a practical voice recognition speed of the user, the DVFS device 617 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 617 monitors a working state of each unit or module (including the storage medium 611, the register unit 612, the interconnection module 613, the computation unit 614, the control unit 615 and the data access unit 616) in the neural network processor in real time. If any unit or module in each unit or module of the neural network processor is in an idle state, the DVFS device sends fifth voltage frequency scaling information to the unit or module to decrease a working voltage or working frequency of the unit or the module to further reduce power consumption of the unit or the module. If the unit or the module returns to a working state, the DVFS device sends sixth voltage frequency scaling information to the unit or the module to increase the working voltage or working frequency of the unit or the module, so as to enable an operating speed of the unit or the module to meet a working requirement.

FIG. D7 is a schematic flowchart of a method for performing single-layer convolutional neural network forward operation according to an embodiment of the application. The method is applied to the abovementioned convolutional operation device. As shown in FIG. D7, the method may include the following.

In S701, an IO instruction is pre-stored at a starting address of an instruction storage unit.

In S702, computation is started, a control unit reads the IO instruction from the starting address of the instruction storage unit, and a data access unit reads, according to a control signal decoded from the IO instruction, all corresponding convolutional neural network computation instructions from an external address space and caches all the instructions in the instruction storage unit.

In S703, the control unit reads in a next IO instruction from the instruction storage unit, and the data access unit reads all data required by a primary computation module from the external address space to a first storage unit of the primary computation module according to a control signal decoded from the next IO instruction.

In S704, the control unit reads in another IO instruction from the instruction storage unit, and the data access unit reads convolutional kernel data required by secondary computation modules from the external address space according to a decoded control signal decoded from another IO instruction.

In S705, the control unit reads in a next CONFIG instruction from the instruction storage unit, and the convolutional operation device configures various constants required by computation of a present layer of a neural network according to a control signal decoded from the next CONFIG instruction.

In S706, the control unit reads in a next COMPUTE instruction from the instruction storage unit, and the primary computation module sends input data in a convolutional window to the N secondary computation modules through an interconnection module according to a control signal decoded from the next COMPUTE instruction, stores the input data in second storage unit of the N secondary computation modules, and moves the convolutional window according to the next COMPUTE instruction.

In S707, computation units of the N secondary computation modules read convolutional kernels from third storage unit according to the control signal decoded from the COMPUTE instruction, read the input data from the second storage units, complete convolutional computation of the input data and the convolutional kernels, and return obtained output scalars through the interconnection module.

In S708, the output scalars returned by the N secondary computation modules are spliced into complete intermediate vectors step by step in the interconnection module.

In S709, the primary computation module obtains the intermediate vectors returned by the interconnection module, moves the convolutional window to traverse all the input data, splices all the intermediate returned vectors into an intermediate result, reads offset data from the first storage unit according to the control signal decoded from the COMPUTE instruction, and adds the offset data and the intermediate result together to obtain an offset result through a vector addition unit. An activation unit activates the offset result and writes final output data back into the first storage unit.

In S710, the control unit reads in yet another IO instruction from the instruction storage unit, and the data access unit stores the output data of the first storage unit to a specified address of the external address space according to a control signal decoded from the yet another IO instruction. The computation is ended.

In one implementation, the method may further include the following:

acquiring working state information of the convolutional operation device in real time;

sending voltage frequency scaling information to the convolutional operation device according to the working state information of the convolutional operation device, in which the voltage frequency scaling information may be configured to instruct the convolutional operation device to scale its working voltage or working frequency.

In one implementation, the working state information of the convolutional operation device may include an operating speed of the convolutional operation device, in which the voltage frequency scaling information may include first voltage frequency scaling information, and sending the voltage frequency scaling information to the convolutional operation device according to the working state information of the convolutional operation device may include:

if the operating speed of the convolutional operation device is greater than a target speed, sending the first voltage frequency scaling information to the convolutional operation device, in which the first voltage frequency scaling information may be configured to instruct the convolutional operation device to decrease its working frequency or working voltage and the target speed may be an operating speed of the convolutional operation device if a user requirement is met.

In one implementation, the working state information of the convolutional operation device may include an operating speed of the data access unit and an operating speed of the primary computation module, the voltage frequency scaling information may include second voltage frequency scaling information, and sending the voltage frequency scaling information to the convolutional operation device according to the working state information of the convolutional operation device further may include:

according to the operating speed of the data access unit and the operating speed of the primary computation module, in response to a running time of the data access unit being determined to exceed a running time of the primary computation module, sending the second voltage frequency scaling information to the primary computation module, in which the second voltage frequency scaling information may be configured to instruct the primary computation module to decrease its working frequency or working voltage.

In one implementation, the voltage frequency scaling information may include third voltage frequency scaling information, and sending the voltage frequency scaling information to the convolutional operation device according to the working state information of the convolutional operation device may further include:

according to the operating speed of the data access unit and the operating speed of the primary computation module, in response to the running time of the primary computation module being determined to exceed the running time of the data access unit, sending the third voltage frequency scaling information to the data access unit, in which the third voltage frequency scaling information may be configured to instruct the data access unit to decrease its working frequency or working voltage.

In one implementation, the working state information of the convolutional operation device may include working state information of at least S units/modules of the instruction storage unit, the control unit, the data access unit, the interconnection module, the primary computation module and the N secondary computation modules, in which S may be an integer larger than one and less than or equal to N+5, the voltage frequency scaling information may include fourth voltage frequency scaling information, and sending the voltage frequency scaling information to the convolutional operation device according to the working state information of the convolutional operation device may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage.

The unit A is any one of the at least S units/modules.

In one implementation, the voltage frequency scaling information may include fifth voltage frequency scaling information, and sending the voltage frequency scaling information to the convolutional operation device according to the working state information of the convolutional operation device further include:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

It is to be noted that a specific implementation process of the abovementioned method embodiment may refer to related descriptions in the embodiments shown in FIGS. D1-D6 and will not be described herein.

An embodiment of the application, a method for performing multilayer convolutional neural network forward operation is provided, which may include that: the neural network forward operation method shown in FIG. D7 is performed on each layer, after performing for a previous layer of a convolutional neural network, a computational instruction of a present layer takes an output data address, stored in a primary computation module, of the previous layer as an input data address of the present layer, and convolutional kernel and offset data addresses in the instruction are changed into corresponding addresses of the present layer.

It is to be noted that each unit or module may be a circuit, including a digital circuit, an analogue circuit, and the like. Physical implementation of a structure of each unit or module may include, but is not limited to, a physical device, which may include, but is not limited to, a transistor, a memristor, and the like. The chip or the neural network processor may be any proper hardware processor, for example, a CPU, a GPU, an FPGA, a digital signal processor (DSP), and an ASIC. The storage unit may be any proper magnetic storage medium or magneto-optic storage medium, for example, a resistive random access memory (RRAM), a DRAM, a SRAM, an enhanced dynamic random access memory (EDRAM), a high bandwidth memory (HBM), and a hybrid memory cube (HMC), and the like.

The application may be applied to numerous universal or dedicated computer system environments or configurations, for example, a personal computer (PC), a server computer, a handheld device or a portable device, a tablet device, a multiprocessor system, a microprocessor-based system, a set-top box, a programmable consumer electronic device, a network PC, a minicomputer, a large computer, and a distributed computation environment including any abovementioned system or device.

According to an embodiment, the application provides a chip, which may include the abovementioned computation device. The chip may simultaneously perform various types of computation on a weight and an input neuron to achieve computational diversity. In addition, a dedicated on-chip cache for the multilayer artificial neural network computation algorithm is adopted, so that reusability of the input neurons and the weight data is fully mined, repeated reading of these data from the memory is avoided, a memory access bandwidth is reduced, and the problem that a memory bandwidth becomes a performance bottleneck of multilayer artificial neural network computation and a training algorithm of the multilayer artificial neural network computation is solved.

An embodiment of the application provides a chip package structure, which may include the abovementioned neural network processor.

An embodiment of the application provides a board card, which may include the abovementioned chip package structure.

An embodiment of the application provides an electronic device, which may include the abovementioned board card.

The electronic device may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a transportation means, a household electrical appliance, and a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

Those of ordinary skill in the art may realize that the units and algorithm steps of each example described in combination with the embodiments of the application may be implemented by electronic hardware, computer software, or a combination of the two. For clearly describing exchangeability of the hardware and the software, compositions and steps of each example have been generally described in the descriptions according to functions. Whether these functions are performed in a hardware or software manner depends on specific applications and design constraints of the technical solutions. Professionals may realize the described functions for each specific application by use of different methods, but such realization shall fall within the scope of the application.

Those skilled in the art may clearly know that, for convenient and brief description, working processes of terminals and units described above may refer to the corresponding processes in the method embodiments and will not be elaborated herein.

In the embodiments provided by the application, it is to be understood that the disclosed terminals and methods may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not performed. In addition, coupling, direct coupling, or communication connection between each displayed or discussed component may be indirect coupling or communication connection, implemented through some interfaces, devices, or units, and may be electrical, mechanical, or in other forms.

The units described as separate parts may or may not be physically separated. Parts displayed as units may or may not be physical units, and for example, may be located in the same place, or may also be distributed in multiple network units. Part or all of the units may be selected to achieve the purpose of the solutions of the embodiments of the application according to a practical requirement.

In addition, each functional unit in the embodiments of the application may be integrated into a processing unit, each unit may also physically exist independently, and two or more units may also be integrated into one unit. The integrated unit may be implemented in the form of hardware or a software functional unit.

If being implemented in the form of a software functional unit and sold or used as an independent product, the integrated unit may be stored in a computer-readable storage medium. Based on such an understanding, all or part of the technical solutions may be embodied in form of software product. The computer software product is stored in a storage medium, including a plurality of instructions configured to enable a computer device (which may be a PC, a server, a network device, or the like) to perform all or part of the operations of the method in each embodiment of the application. The storage medium may include various media capable of storing program codes such as a U disk, a mobile hard disk, a read-only memory (ROM), a random access memory (RAM), a magnetic disk, or an optical disk.

It is to be noted that implementation modes which are not shown or described in the drawings or the body of the specification are all in forms known to those of ordinary skill in the art and are not described in detail. In addition, the definitions about each component and method are not limited to each specific structure, shape, or manner mentioned in the embodiments, to which those of ordinary skill in the art may make simple modifications or replacements.

The purposes, technical solutions, and beneficial effects of the application are further described above with the specific embodiments in detail. It is to be understood that the above is only the specific embodiment of the application and not intended to limit the application. Any modifications, equivalent replacements, improvements, and the like made within the spirit and principle of the application shall fall within the scope of protection of the application.

What is claimed:

1. A convolutional operation device, comprising:
    a Dynamic Voltage Frequency Scaling device, an instruction storage unit, a control unit, a data access unit, an interconnection module, a primary computation module and multiple secondary computation modules, wherein
    the instruction storage unit is configured to store an instruction read in by the data access unit;
    the control unit is configured to read the instruction from the instruction storage unit and decode the instruction into a control signal for controlling an operation of other modules, where the other modules comprise the data access unit, the primary computation module, and the multiple secondary computation modules;
    the data access unit is configured to perform data or instruction read/write operation between an external address space and the convolutional operation device;
    the multiple secondary computation modules are configured to implement convolutional operation of input data and convolution kernels in a convolutional neural network algorithm;
    the interconnection module is configured for data transfer between the primary computation module and the secondary computation modules;
    the primary computation module is configured to splice intermediate vectors of all the input data into an intermediate result and perform subsequent operation on the intermediate result;
    the Dynamic Voltage Frequency Scaling device is configured to acquire working state information of the convolutional operation device and send voltage frequency scaling information to the convolutional operation device according to the working state information of the convolutional operation device, where the voltage frequency scaling information is configured to instruct the convolutional operation device to scale its working voltage or working frequency,
    wherein the primary computation module includes a first storage unit, a first computation unit, and a first data dependency relationship judgment unit.

2. The convolutional operation device of claim 1, wherein the primary computation module is further configured to:
    add the intermediate result and offset data and perform an activation operation.

3. The convolutional operation device of claim 1, wherein the multiple secondary computation modules are configured to:
    concurrently compute respective output scalars using the same input data and their respective convolutional kernels.

4. The convolutional operation device of claim 1, wherein an active function active used by the primary computation module is any nonlinear function including sigmoid, tanh, relu, and softmax.

5. The convolutional operation device of claim 1, wherein the interconnection module forms a data path of continuous or discrete data between the primary computation module and the multiple secondary computation modules, and the interconnection module is any structure in a tree structure, a ring structure, a grid structure, a hierarchical interconnection structure, and a bus structure.

6. The convolutional operation device of claim 1, wherein:
    the first storage unit is configured to cache the input data and output data used by the primary computation module in a computation process;
    the first computation unit is configured to complete various computational functions of the primary computation module; and
    the first data dependency relationship judgment unit is configured as a port through which the first computation unit reads and writes the first storage unit to ensure data read/write consistency of the first storage unit, and configured to read an input neuron vector from the first storage unit, to send the input neuron vector to the multiple secondary computation modules through the interconnection module, and to send an intermediate result vector from the interconnection module to the first computation unit.

7. The convolutional operation device of claim 1, wherein each secondary computation module of the multiple secondary computation modules includes:
    a second computation unit configured to receive the control signal sent by the control unit and perform arithmetic logical operation;
    a second data dependency relationship judgment unit configured to perform a read/write operation on a second storage unit and a third storage unit in a computation process to ensure read/write consistency of the second storage unit and the third storage unit;
    the second storage unit configured to cache the input data and the output scalar obtained by computation of the secondary computation module; and
    the third storage unit configured to cache the convolutional kernel required by the secondary computation module in the computation process.

8. The convolutional operation device of claim 7, wherein the first data dependency relationship judgment unit and the second data dependency relationship judgment unit are configured to:

ensure the read/write consistency, judge whether a dependency relationship is formed between data of a control signal which has yet not been performed and a control signal which is under execution, if a dependency relationship is not formed between data of a first control signal that has yet not been performed and a second control signal that is under execution, allow the control signal to be sent immediately, and allow the control signal to be sent only after all control signals the control signal depends on are performed if a dependency relationship is formed between data of the first control signal and the second control signal.

9. The convolutional operation device of claim 1, wherein the data access unit reads in at least one of the input data, the offset data, and the convolutional kernels from the external address space.

10. The convolutional operation device of claim 1, wherein the Dynamic Voltage Frequency Scaling device includes:
an information acquisition unit configured to acquire the working state information of the convolutional operation device in real time; and
a voltage frequency scaling unit configured to send the voltage frequency scaling information to the convolutional operation device according to the working state information of the convolutional operation device, where the voltage frequency scaling information is configured to instruct the convolutional operation device to scale its working voltage or working frequency,
wherein the voltage frequency scaling information includes first voltage frequency scaling information.

11. The convolutional operation device of claim 10, wherein the working state information of the convolutional operation device includes an operating speed of the convolutional operation device, and the voltage frequency scaling unit is configured to:
if the operating speed of the convolutional operation device is higher than a target speed, send the first voltage frequency scaling information to the convolutional operation device, where the first voltage frequency scaling information is configured to instruct the convolutional operation device to decrease its working frequency or working voltage, and the target speed is an operating speed of the convolutional operation device if a user requirement is met.

12. The convolutional operation device of claim 10, wherein the working state information of the convolutional operation device includes an operating speed of the data access unit and an operating speed of the primary computation module, the voltage frequency scaling information includes second voltage frequency scaling information, and the voltage frequency scaling unit is further configured to:
in response to determining, according to the operating speed of the data access unit and the operating speed of the primary computation module, that a running time of the data access unit exceeds a running time of the primary computation module, send the second voltage frequency scaling information to the primary computation module, where the second voltage frequency scaling information is configured to instruct the primary computation module to decrease its working frequency or working voltage,
wherein the voltage frequency scaling information includes third voltage frequency scaling information.

13. The convolutional operation device of claim 12, wherein the voltage frequency scaling unit is further configured to:
in response to determining, according to the operating speed of the data access unit and the operating speed of the primary computation module, that the running time of the primary computation module exceeds the running time of the data access unit, send the third voltage frequency scaling information to the data access unit, where the third voltage frequency scaling information is configured to instruct the data access unit to decrease its working frequency or working voltage.

14. The convolutional operation device of claim 12, wherein the working state information of the convolutional operation device includes working state information of at least one unit in the instruction storage unit, the control unit, the data access unit, the interconnection module, the primary computation module, and the multiple secondary computation modules, wherein a count of the at least one unit is less than or equal to a count of the multiple secondary computation modules plus five, the voltage frequency scaling information includes fourth voltage frequency scaling information, and the voltage frequency scaling unit is configured to:
in response to determining, according to the working state information of a target unit, that the target unit is in an idle state, send the fourth voltage frequency scaling information to the target unit, where the fourth voltage frequency scaling information is configured to instruct the target unit to decrease its working frequency or working voltage, and the target unit is any one of the at least one units.

15. The convolutional operation device of claim 14, wherein the voltage frequency scaling information includes fifth voltage frequency scaling information, and the voltage frequency scaling unit is further configured to:
in response to determining, according to the working state information of the target unit, that the target unit returns to a working state, send the fifth voltage frequency scaling information to the target unit, where the fifth voltage frequency scaling information is configured to instruct the target unit to increase its working voltage or working frequency.

16. A method for performing a single-layer convolutional neural network forward operation, comprising:
pre-storing an input/output instruction at a starting address of an instruction storage unit;
if operation is started, a control unit reading the input/output instruction from the starting address of the instruction storage unit, and a data access unit reading, according to a control signal decoded from the input/output instruction, all corresponding convolutional neural network computational instructions from an external address space, and caching all the instructions in the instruction storage unit;
the control unit reading in a next input/output instruction from the instruction storage unit, and the data access unit reading all data required by a primary computation module from the external address space to a first storage unit of the primary computation module according to a control signal decoded from the next input/output instruction;
the control unit reading in another input/output instruction from the instruction storage unit, and the data access unit reading convolutional kernel data required by secondary computation modules from the external address space according to a control signal decoded from another input/output instruction;

the control unit reading in a next CONFIG instruction from the instruction storage unit, and the convolutional operation device configuring various constants required by computation of a present layer of a neural network according to a control signal decoded from the next CONFIG instruction;

the control unit reading in a next COMPUTE instruction from the instruction storage unit, and the primary computation module sending input data in a convolutional window to the multiple secondary computation modules through an interconnection module according to a control signal decoded from the next COMPUTE instruction, storing the input data in second storage unit of the multiple secondary computation modules, and moving the convolutional window according to the instruction;

computation units of the multiple secondary computation modules reading convolutional kernels from a third storage unit according to the control signal decoded from the COMPUTE instruction, reading the input data from the second storage units, completing convolutional operation of the input data and the convolutional kernels, and returning obtained output scalars through the interconnection module;

splicing the output scalars returned by the multiple secondary computation modules into complete intermediate vectors step by step in the interconnection module;

the primary computation module obtaining the intermediate vectors returned by the interconnection module, moving the convolutional window to traverse all the input data, splicing all the returned intermediate vectors into an intermediate result, reading offset data from the first storage unit according to the control signal decoded from the COMPUTE instruction, and adding the offset data and the intermediate result together to obtain an offset result through a vector addition unit; and then an activation unit activating the offset result and writing final output data back into the first storage unit;

the control unit reading in yet another input/output instruction from the instruction storage unit, and the data access unit storing the output data of the first storage unit to a specified address of the external address space according to a control signal decoded from the next input/output instruction, then ending the operation.

17. The method of claim 16, wherein the method further includes:
acquiring working state information of the convolutional operation device in real time; and
sending voltage frequency scaling information to the convolutional operation device according to the working state information of the convolutional operation device, where the voltage frequency scaling information is configured to instruct the convolutional operation device to scale its working voltage or working frequency.

18. The method of claim 17, wherein the working state information of the convolutional operation device includes an operating speed of the convolutional operation device, the voltage frequency scaling information includes first voltage frequency scaling information, and sending the voltage frequency scaling information to the convolutional operation device according to the working state information of the convolutional operation device includes:

if the operating speed of the convolutional operation device is higher than a target speed, sending the first voltage frequency scaling information to the convolutional operation device, where the first voltage frequency scaling information is configured to instruct the convolutional operation device to decrease its working frequency or working voltage, and the target speed is an operating speed of the convolutional operation device if a user requirement is met.

19. The method of claim 18, wherein the working state information of the convolutional operation device includes an operating speed of the data access unit and an operating speed of the primary computation module, the voltage frequency scaling information includes second voltage frequency scaling information, and sending the voltage frequency scaling information to the convolutional operation device according to the working state information of the convolutional operation device further includes:

sending the second voltage frequency scaling information to the primary computation module, according to the operating speed of the data access unit and the operating speed of the primary computation module, in response to a running time of the data access unit being determined to exceed a running time of the primary computation module, where the second voltage frequency scaling information is configured to instruct the primary computation module to decrease its working frequency or working voltage, wherein the voltage frequency scaling information includes third voltage frequency scaling information.

20. The method of claim 19, wherein sending the voltage frequency scaling information to the convolutional operation device according to the working state information of the convolutional operation device further includes:

according to the operating speed of the data access unit and the operating speed of the primary computation module, in response to the running time of the primary computation module being determined to exceed the running time of the data access unit, sending the third voltage frequency scaling information to the data access unit, where the third voltage frequency scaling information is configured to instruct the data access unit to decrease its working frequency or working voltage.

21. The method of claim 19, wherein the working state information of the convolutional operation device includes working state information of at least one units in the instruction storage unit, the control unit, the data access unit, the interconnection module, the primary computation module, and the multiple secondary computation modules, wherein a count of the at least one units is less than or equal to a count of the multiple secondary computation modules plus five, the voltage frequency scaling information includes fourth voltage frequency scaling information, and sending the voltage frequency scaling information to the convolutional operation device according to the working state information of the convolutional operation device further includes:

according to the working state information of a target unit, in response to the target unit being determined to be in an idle state, sending the fourth voltage frequency scaling information to the target unit, where the fourth voltage frequency scaling information is configured to instruct the target unit to decrease its working frequency or working voltage, where the target unit is any one of the at least one units.

22. The method of claim 21, wherein the voltage frequency scaling information includes fifth voltage frequency scaling information, and sending the voltage frequency scaling information to the convolutional operation device according to the working state information of the convolutional operation device further includes:

according to the working state information of the target unit, in response to the target unit being determined to return to a working state, sending the fifth voltage frequency scaling information to the target unit, where the fifth voltage frequency scaling information is configured to instruct the target unit to increase its working voltage or working frequency.

\* \* \* \* \*